May 29, 1928.
E. P. SEGHERS
1,671,258
RAT TRAP
Original Filed Oct. 21, 1922
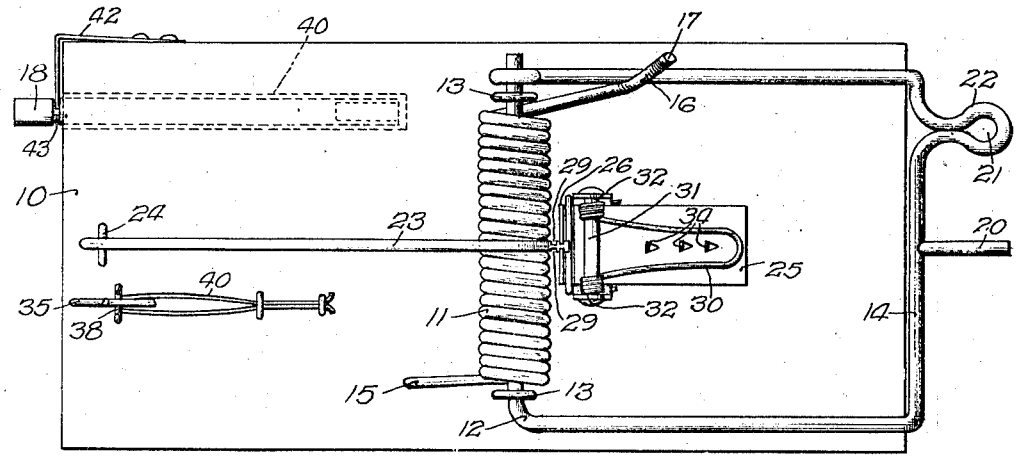
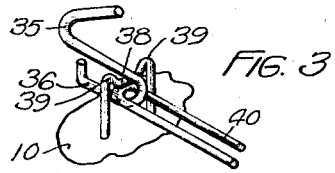
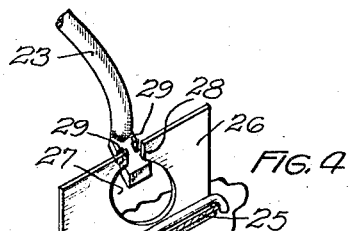
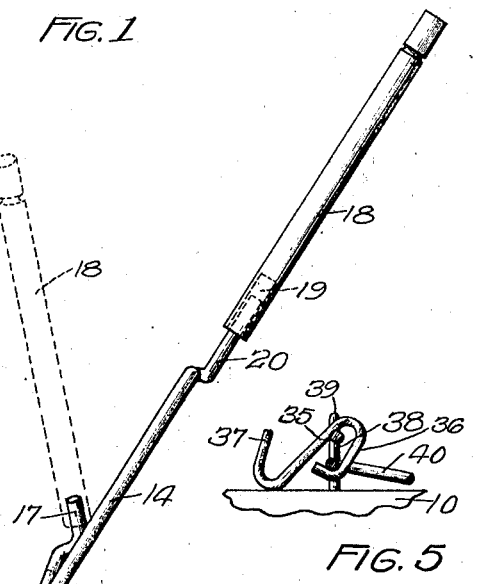
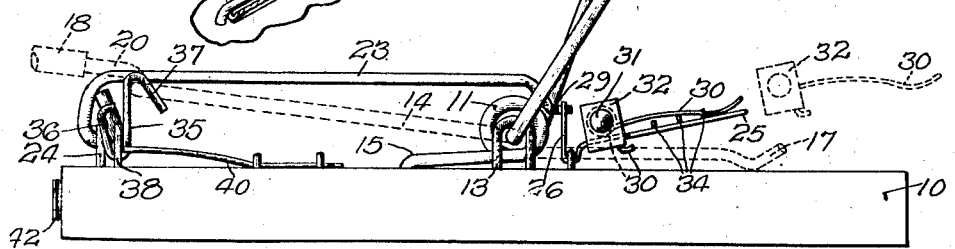
INVENTOR:
Emiel P. Seghers
By Nissen & Gerard ATTYS.

Patented May 29, 1928.

1,671,258

UNITED STATES PATENT OFFICE.

EMIEL P. SEGHERS, OF CHICAGO, ILLINOIS.

RAT TRAP.

Application filed October 21, 1922, Serial No. 595,950. Renewed April 10, 1928.

This invention relates to traps for catching rats or other animals, and has for its object the provision of a device of the class named which shall be of improved construction and convenient and efficient in operation.

The invention is exemplified in the combination and arrangement of parts shown in the accompanying drawing and described in the following specification, and it is more particularly pointed out in the appended claims.

In the drawing,—

Fig. 1 is a plan view of a trap embodying one form of the present invention.

Fig. 2 is an elevation of the trap shown in Fig. 1, with the jaw raised.

Figs. 3 and 4 are fragmentary perspective views showing details of construction.

Fig. 5 is a fragmentary elevation with parts in section showing one position of the safety catch.

Manipulation of rat traps as heretofore constructed is usually distasteful and more or less dangerous. Setting such traps endangers the hands of the operator and the removal of the dead body is usually a disagreeable operation. The present invention obviates these undesirable features and at the same time renders the trap more certain in its operation and makes it more difficult for the animal to remove the bait without springing the trap.

In the drawing, the numeral 10 designates the base of a well known form of spring trap. The base is commonly made of a rectangular wooden block. Mounted centrally on the base 10 is a coiled spring 11 surrounding a pivot wire 12, which is secured to the block by staples 13. One end of the pivot wire 12 is continued toward the end of the block 10 to form the jaw of the trap 14. One end of the coiled spring 11 bears against the upper face of the base 10 at 15, while the other end of the spring is removably hooked across the jaw 14, as shown at 16. The portion 16 is continued to provide a stud 17, over which the hollow end of a setting tool 18 may be fitted as shown in broken lines in Fig. 2. The tool 18 may be used to shift the hook 16 inwardly and clear the jaw 14, thus leaving the jaw free from the spring 11, so that by inverting the trap the jaw will drop downwardly and automatically free itself of any animal that has been caught. In this way the dead body may be removed from the trap without in any way bringing the hands into proximity to the carcass. The hook portion 16 may be pushed laterally from the jaw without the use of the tool 18, but the operation may be more conveniently performed by using the tool, which is provided with an opening 19 as shown in Fig. 2. The tool is also convenient for providing leverage to more easily lift the end of the spring to replace it upon the jaw 14. The tool 18 is also convenient for moving the jaw to its set position. For this purpose the jaw is provided with a pin 20, over which the tool 18 is placed to give greater leverage in raising the jaw for setting the trap. The same result may be secured by inserting the tool 18, or any other bar of similar dimension such as a spike nail, in the opening 21 of a loop 22 formed on the jaw 14. In the absence of a suitable instrument for inserting in the opening, the loop 22 forms a convenient finger-piece to be grasped by the operator in setting the trap. The jaw 14 is held in its set position by a bar 23 secured to the base 10 by a staple 24. The forward end of the bar 23 is held by a trigger 25, on which the bait is placed. The trigger 25 is provided with an upright plate 26 and an opening 27 for receiving the end of the bar 23, as shown in Fig. 4. It will be understood that when the trigger 25 is pressed downwardly, the opening 27 will be slipped from the end of the bar 23 and the trap sprung. However, experience has shown that rats become very cunning and learn to remove the bait by lifting it from the trigger without exerting any downward pressure on the trigger. The present invention provides means for springing the trap even though upward force only is exerted on the bait. This result is secured by providing a slot 28 at the top of the opening 27 and forming notches 29 at each side of the end of the bar 23, so that when the plate 26 is shifted backwardly by upward force on the trigger 25 the sides of the slot 28 will pass through the notches 29 and thus release the rod 23. In this way the trap may be sprung by either upward or downward pressure on the trigger. To still further insure springing the trap, a spring tongue 30 is provided to retain the bait in place on the trigger 25. This tongue is carried by a pin 31 extending through ears 32 on a connecting yoke adjacent the ears 32. The tongue 30 may be formed of spring wire, the ends of which are wound about the pin 31 and bear against the yoke 33. The entire device may be removably slid into place over the trigger 25, or the ears 32 may be permanently secured to the trigger if desired. Where the parts are made as shown in the drawing, the tongue may be supplied for use in connection with traps already furnished to the trade and not provided with such accessories. The trigger 25 is preferably provided with points 34 struck upwardly therefrom to penetrate the bait and cooperate with the tongue 30 in holding it in place.

One of the greatest difficulties in the use of traps of this kind is the danger of prematurely releasing the jaw during the setting operation. In the present invention a catch 35 is provided for preventing such mishaps. The catch may be formed of wire or a rod bent as shown in Fig. 2 to provide an elongated loop 36 and a hook 37. The loop 36 is mounted on a staple 38 secured to the base 10, the staple being preferably provided with projections 39, as shown in Fig. 3, to retain the loop at the top of the staple. A spring tongue 40 is attached to the base 10 and engages the loop 36, so as to resiliently force the portion of the loop downwardly beneath the staple 38. It will be seen that the tongue 40 thus retains the catch in any one of three positions to which it may be moved by the operator.

During the operation of setting the trap the catch 38 is first moved to the position shown in Fig. 3, in which one of the long sides of the loop 36 bears on the top of the staple 38, while the tongue 40 presses downwardly on the other long side of the loop directly beneath the top of the staple, so that the hook is held in a balanced position. When the jaw is swung backwardly it will strike the top of the catch 35 just in front of the staple 38 and tilt the hook so that the spring 40 immediately swings it to the position shown in Fig. 2, the downward tension of the spring automatically retaining the catch in its upright position with the hook engaging the jaw 14. This will hold the jaw in its backward position while the trigger is being set. The setting operation requires the pressure of the jaw 14 upwardly against the bar 23 in order to retain the trigger 25 in its set position. The elongated opening in the loop 36 will permit up and down movement of the jaw 14 and give this spring pressure on the bar 23 and yet permit the spring 40 to retain the hook 37 in place upon the jaw. There is no danger, therefore, of displacement of the hook during the setting operation. In actual practice it has been found possible to throw the trap and otherwise carelessly handle it without releasing the jaw 14 from the hook 35, since the spring 40 retains the hook always in contact with the jaw unless it is positively displaced therefrom by the operator. After the trap has been set the spring 40 will yieldingly permit the catch 35 to be shifted from the jaw 14, thus leaving the jaw free to operate when the trap is sprung. After the catch 35 is removed from the jaw 14 the spring 40 will also serve to hold it in its inoperative position as shown in Fig. 5, so that there is no danger of the safety catch interfering with the springing of the trap. The setting tool 18 may be conveniently stored in an opening 41 in the base 10, and a spring clip 42 may be provided to engage the notch 43 formed in the periphery of the tool to prevent accidental loss of the tool.

I claim:

1. A trap having a spring jaw, a safety catch for holding said jaw in open position, and means for holding said safety catch in either operative or inoperative position, said means comprising a spring for holding said safety catch in operative position, said spring operating to return said safety catch to said position when displaced a limited amount therefrom.

2. A trap having a spring jaw, trigger mechanism for holding said jaw open, a catch for holding said jaw open independently of said trigger mechanism, and means for holding said safety catch in either operative or inoperative position, said means comprising a spring operating to retain said catch in operative relation with said jaw during a setting operation of said jaw and while said jaw is moved into and out of position in which spring tension thereof acts upon said trigger mechanism.

3. A trap comprising a spring jaw, trigger mechanism for holding said jaw in set position, a catch for retaining said jaw in open position independently of said trigger mechanism, said catch being movable into an operative and an inoperative position, and resilient means for retaining said catch in either of said positions said resilient means being operable to return said catch toward operative position when moved a limited amount therefrom.

4. A trap comprising a spring jaw, trigger mechanism for holding said jaw in set position, a safety catch operable by said jaw for holding said jaw in open position, and means for retaining said catch either in position to be operated by said jaw when said jaw is opened or in an inoperative position out of the path of said catch.

5. A trap comprising a spring jaw, a catch for retaining said jaw in open position, said catch being movable into a jaw retaining position, an inoperative position and an intermediate position in which last-named position said catch is disposed in the path of said jaw when said jaw is opened and from which last-named position it is moved by said jaw into jaw retaining position, and a spring for retaining said catch in each of its three positions.

6. A trap comprising a spring jaw, a catch for retaining said jaw in open position, a holding device for said catch extending through an eye therein, and a spring engaging said eye to hold said catch in various positions.

7. A trap having a fall member, trigger mechanism for retaining said fall member in set position, and a safety catch operated by said fall member when opened and movable into position to prevent accidental closing of said fall member during setting of said trigger mechanism and means for holding said safety catch in inoperative position to permit closing of said fall member.

8. A trap having a fall member, trigger mechanism for retaining said fall member in set position, a safety catch operated by said fall member when opened and movable into position to prevent accidental closing of said fall member during setting of said trigger, and yielding means for retaining said safety catch in operative and inoperative position.

9. In combination, a trap having a fall or jaw member, means for exerting force on said member to close the same, trigger mechanism for retaining said fall in set position, and a safety hook for preventing accidental release of said fall, said safety hook being movable into position to hold said jaw member against the closing force thereon and arranged to remain in set position independently of contact with said fall and having an overhanging portion extending into position to prevent accidental displacement of said safety hook while acting on said fall member against said closing force and to require movement of said fall against the force exerted thereon before said safety hook can be released from said fall.

10. In combination, a trap having a fall or jaw member, means for exerting closing force on said fall or jaw, trigger mechanism for retaining said fall in set position, and a safety catch movable into position to engage said jaw member to counteract the force thereon and prevent closing of said member, said catch having an abutment or stop overhanging said jaw in position to prevent accidental disengagement of said safety catch from said fall while said catch is subjected to the closing force of said fall said catch being arranged to remain in operative position when freed from the closing force of said fall until said catch is positively removed from set position by the operator.

11. A trap comprising a fall, trigger mechanism for holding said fall in set position, and a safety catch for preventing accidental release of said fall during setting of said trigger mechanism, said catch having means thereon in position to intercept release movement of said catch when said fall is held by said catch for preventing release of said catch while in operative relation with said fall but permitting release thereof when said fall is held by said trigger mechanism said catch being mounted to remain in operative position when so placed until removed therefrom by the operator.

12. A trap comprising a fall, trigger mechanism for holding said fall in set position and a safety catch movable into and out of operative position for preventing accidental release of said fall while said trigger mechanism is being set, said catch having means thereon for engaging said fall to intercept movement of said catch to inoperative position when said fall is engaged by said catch, said fall being held out of the path of said means when said fall is held by said trigger mechanism said catch being mounted to remain in operative position in the path of said fall until withdrawn therefrom by the operator after it has been moved to said position.

13. In combination, a trap comprising a jaw member, trigger mechanism for retaining said jaw member in open position, and a safety catch actuated by said jaw member when opened and movable when so actuated into position for retaining said jaw member in open position while said trigger mechanism is being set and means for retaining said trigger mechanism in inoperative position after said trap has been set.

14. In combination, a trap comprising a fall or jaw, a safety catch for preventing operation of said fall arranged to be moved into operative relation with said fall by the setting of said fall, and means for retaining said catch out of operative relation with said fall.

15. A trap comprising a fall, trigger mechanism for releasably holding said fall in set position, and means actuated by said fall when opened for preventing accidental release of said fall during setting of said trigger mechanism said means being movable to a position out of the path of said fall in which position it is arranged to remain while said trap is set.

16. A trap having a spring jaw, a safety catch for holding said jaw in open position, said catch being movable to an inoperative position outside the space included within the path of movement of said jaw, and a spring for holding said safety catch in operative position, said spring operating to return said safety catch to said position when displaced a limited amount therefrom.

17. In a trap having a spring actuated fall and a trigger mechanism for setting said fall under the influence of said spring, the combination of a safety catch for arresting the influence of said spring and preventing accidental closing of said fall, said catch being movable into a position in the path of said fall and prevented from moving out of said position until said fall has been depressed by means other than said catch.

18. In a trap having a spring actuated fall and a trigger mechanism for setting said fall under the influence of said spring, the combination of a safety catch for arresting the influence of said spring and preventing accidental closing of said fall, said catch being movable into a position in the path of said fall and prevented by said fall from moving out of said position until said fall has been depressed by means other than said catch.

19. In a trap having a spring actuated fall and a trigger mechanism for setting said fall under the influence of said spring, the combination of a safety catch for arresting the influence of said spring and preventing accidental closing of said fall, said catch comprising a hook movable into a position in the path of said fall and adapted to automatically remain in such position when said fall is depressed.

20. A trap comprising a fall, trigger mechanism for holding said fall in set position and a safety catch movable into the path of said fall for preventing accidental closing of said fall, said catch having an abutment portion for engaging said fall to prevent release of said catch from said fall when said fall is held by said catch, said fall and abutment being free from each other to permit withdrawal of said catch when said fall is held by said trigger mechanism, said catch being mounted to remain automatically in operative relation with said fall when said fall is held by said trigger mechanism until said catch is positively moved by the operator out of operative relation.

21. A trap comprising a fall, trigger mechanism for holding said fall in set position, and a safety catch for preventing accidental closing of said fall, said catch having an abutment portion for preventing accidental disengagement of said catch from said fall when said fall is held by said catch, said abutment portion being positioned to require movement of said fall against the closing force thereof to permit release of said catch from said fall, said fall being held in position by said trigger mechanism to permit free withdrawal of said catch to inoperative position without interference between said abutment portion and fall, said catch being mounted however to remain automatically in operative relation with said fall when said fall is so moved against the closing force thereof until said catch is positively moved by the operator out of said operative relation.

In testimony whereof I have signed my name to this specification on this 19th day of October, A. D. 1922.

EMIEL P. SEGHERS.